United States Patent [19]
Boudreau et al.

[11] 3,781,815
[45] Dec. 25, 1973

[54] TERMINAL INTERFACE FOR A SERIAL LOOP COMMUNICATIONS SYSTEM HAVING STORE AND FORWARD CAPABILITY

[75] Inventors: Paul E. Boudreau; Roy C. Dixon, both of Raleigh; Robert A. Donnan, Chapel Hill, all of N.C.; Eual A. Moss, Fort Wayne, Ind.

[73] Assignee: International Business Machines Corporation, Armonk, N.Y.

[22] Filed: Feb. 15, 1972

[21] Appl. No.: 226,443

[52] U.S. Cl. .......... 340/172.5
[51] Int. Cl. .......... G06f 3/04
[58] Field of Search .......... 340/172.5

[56] References Cited

UNITED STATES PATENTS

| | | | |
|---|---|---|---|
| 3,659,271 | 4/1972 | Collins et al. | 340/172.5 |
| 3,680,053 | 7/1972 | Cotton et al. | 340/172.5 |
| 3,680,056 | 7/1972 | Kropfl et al. | 340/172.5 |
| 3,633,169 | 1/1972 | Bickford | 340/172.5 |
| 3,638,195 | 1/1972 | Brender et al. | 340/172.5 |
| 3,681,759 | 8/1972 | Hill | 340/172.5 |

*Primary Examiner*—Paul J. Henon
*Assistant Examiner*—John P. Vandenburg
*Attorney*—John B. Frisone et al.

[57] ABSTRACT

A serial loop data communications system having store and forward capability at each terminal interface on the loop and in which data signal entities, each of which includes a plurality of data bits, addressed to subsequent terminals on the loop are stored in successive locations in a serial storage device when received if a terminal associated with the interface is transmitting. At the termination of data transmission by the associated terminal, the previously stored data signal entities are forwarded from the data entity storage position occupied by the oldest received entity and subsequently received entities are advanced to successive entity storage positions until data signal entities for subsequent terminals on the loop are no longer received, at which time advancement of the date signal entities is terminated and the data signal entities then remaining in storage, are forwarded from the successive entity storage locations in the serial storage in the order of receipt.

5 Claims, 9 Drawing Figures

PATENTED DEC 25 1973 3,781,815

TERMINAL INTERFACE FOR A SERIAL LOOP COMMUNICATIONS SYSTEM HAVING STORE AND FORWARD CAPABILITY

FIELD OF THE INVENTION

The invention relates to data communications systems in general, and more particularly, to serial loop data communications systems in which the input/output terminal interfaces with the loop are provided with a highly efficient store and forward capability.

DESCRIPTION OF THE PRIOR ART

Serial loop data communications systems with store and forward capability have been known for some time. J. M. Unk describes such a system in an article entitled, "Communications Networks for Digital Information," published in the IRE Transaction on Communications Systems, December, 1960. The system disclosed by Unk includes a digital computer having an output connected to the first concentrator of a series connected group of concentrators and an input connected to the last concentrator in the series group. The article, in addition, discusses a duplex arrangement of loops which may be used for back-up and for shortening the message paths between the terminals connected to the concentrators and the digital computer. The duplex arrangement need not be considered further, since it is a refinement which is not pertinent to the subject matter of this application.

The concentrators connected to the loop provide an interface therewith, which has store and forward capability. Each concentrator is provided with a serial shift register having a fixed amount of data storage. When a terminal connected to the concentrator has a data message, limited in length to the storage capability of the serial shift register, the concentrator examines the shift register storage to determine if it is vacant. If the storage is vacant and available, the terminal is authorized to transmit.

If, during transmission of a local message to the computer, the concentrator receives a message either for the computer or a terminal down stream in the loop, the concentrator stores the message by shifting the received message into the serial shift register. Since the local transmitting terminal's message cannot exceed the storage register length, local transmission will be completed prior to storage exhaustion. As soon as local transmission is completed, the previously stored message is shifted out of the storage register onto the loop in the down stream direction.

The storage register will not be cleared until the inbound line of the concentrator becomes idle, that is, free of data for a period equal to the time required to shift out the message data previously stored. If a subsequent message for the computer or a down stream terminal follows the previous message before the previous message is cleared from the storage register, it is inserted in the shift register. Thus, an associated terminal must wait until this message is cleared. Under heavy loading conditions, that is, a large number of consecutive messages separated by time intervals insufficient to completely clear the shift register, associated terminals requiring communications service may experience substantial delays. In interactive systems such as airline reservations or on line banking systems, long delays are unacceptable since they contribute to increased human error. Decreasing the loading factor is in many cases unacceptable, since it results in increased costs which cannot be economically born in many situations.

A more detailed description of the system described by Unk, may be found in three related articles appearing in the Phillips Telecommunications Review; Vol. 24, No. 1, February, 1963, page 13 et seq.; Vol. 24, No. 2, May, 1963, page 68 et seq.; and Vol. 24, No. 2, May, 1963, page 74 et seq.

SUMMARY OF THE INVENTION

The invention contemplates a serial loop data communications system having store and forward capability at each terminal interface on the loop, and in which multibit signal entities for subsequent stations on the loop are stored in a storage device when received, if data originating at the interface is being transmitted. At the termination of transmission at the interface, the stored signal entities are forwarded onto the loop from a single storage location in the order received until data signal entities are no longer received, at which time the then stored signal entities are forwarded from the then attained storage locations in the order in which they were received.

DESCRIPTION OF THE PREFERRED EMBODIMENTS

Figure 1:
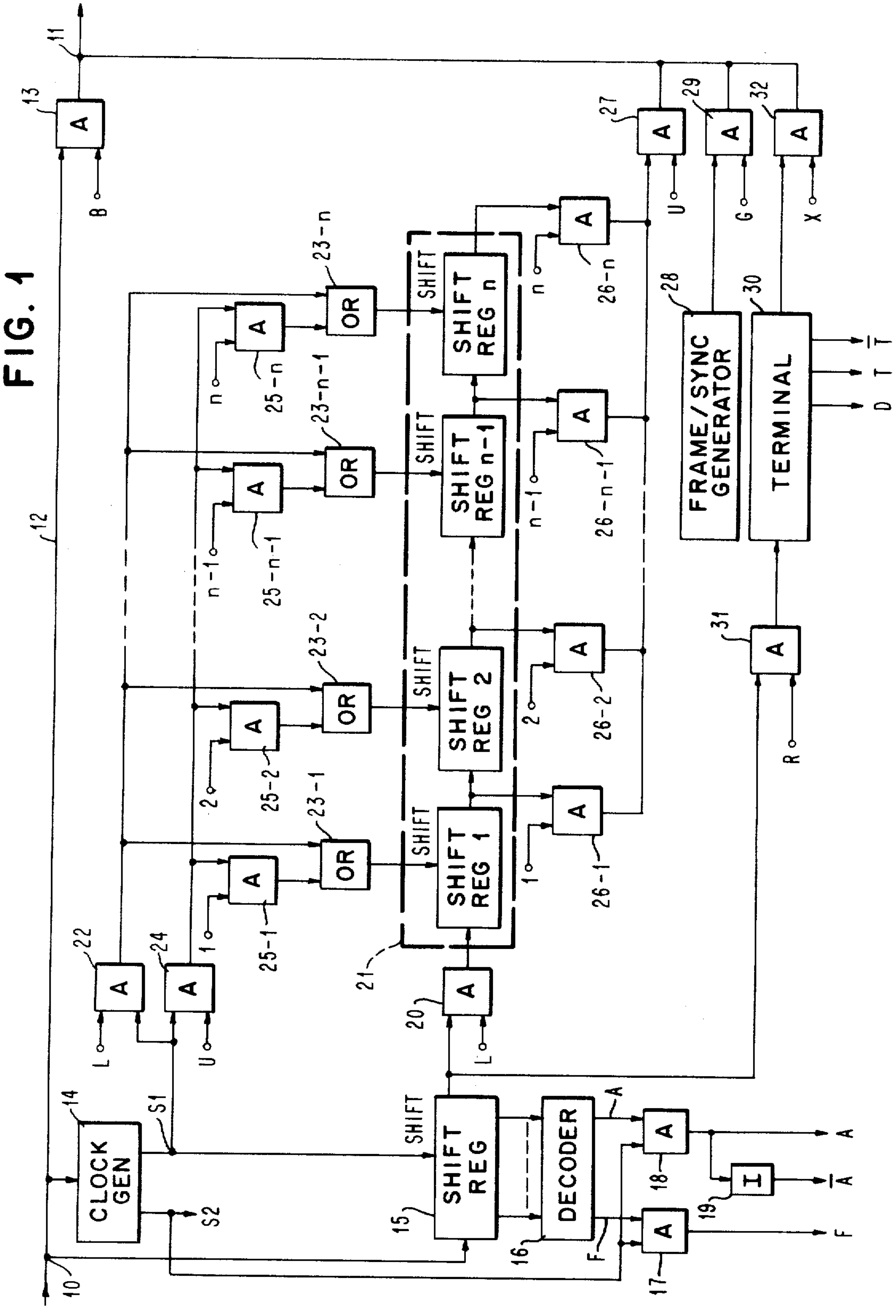
FIG. 1 is a block diagram of a loop interface including a connected terminal constructed according to the invention.

In FIG. 1, a single terminal interface is illustrated and connects to a serial loop communications system at terminals 10 and 11. Each interface includes a bypass path in which data bits on the serial loop pass directly by the interface onto subsequent interfaces on the loop. This path includes a conductor 12 and an AND gate 13 which is under the control of a bypass signal B, the generation of which will be described later. An additional path which will be described below, is provided. When this path is utilized, the path described above is blocked by the absence of the bypass signal B. Thus, data may be inserted and removed from the loop when the interface is not in the bypass mode of operation.

The signals on the loop may take many forms. However, in general, the signals on the loop will include at least the following. A framing or synchronizing signal will be utilized. This signal will include a unique combination of signal bits which will not be found in data. These framing characters indicate to the terminals that there is no data traffic on the loop. In addition, each of the interfaces will be assigned a unique combination of bits which will define or address that station. Thus, messages directed to a terminal connected to the interface will be preceded by the unique combination of bits or address assigned to that terminal. Likewise, messages originating at one of the interface terminals will be preceded by a unique combination of bits identifying either the interface or the terminal. If the interface serves mor than one terminal, then several addresses or combinations will be assigned to each interface, and the interface will recognize all of these combinations insofar as switching messages directed to any of the group of addresses to the appropriate terminal.

A clock generating circuit 14 is connected to the loop at terminal 10, and monitors the bit stream on the loop for deriving clocking signals. The generator 14 supplies a first clocking signal S1, which is identical to the bit rate of the data on the loop. In addition, a second clocking signal S2 is provided. This is an entity or character clock, and occurs at fixed bit intervals which for example, may be in the range of from 4 to 9 or 10. A serial shift register 15 has its input connected to the loop at terminal 10, and the data bits appearing at terminal 10 are shifted into register 15 under control of the S1 clock. This data appears in shift register 15, regardless of the mode of operation of the interface. That is, whether it is in a bypass mode or not in a bypass mode. Shift register 15 is provided with a number of positions corresponding to the entity or character length, and each of the positions is provided with an output which is connected to a decoding circuit 16. Decoder 16 may comprise a plurality of AND gates for examining the content of the shift register 15, and providing an output whenever the content equals some predetermined value. In the illustrated case, the decoder 16 looks for two unique codes. The first code is the framing or synchronizing signal previously described, and the second is the unique address code described above. The address code for each of the terminal interfaces will be different, and thus the decoders for each of the interfaces must be tailored to reflect the unique code assigned to that interface. The framing or synchronizing signal F is applied to one input of an AND circuit 17, while the address code is applied to one input of another AND circuit 18. The S2 pulses from the clock generator 14 are applied to the other inputs of AND circuits 17 and 18 to cause the decoding function to occur at character synchronization time. Thus, AND circuits 17 and 18 will provide outputs only if the conditions specified occur during the character synchronization period. The output of AND circuit 18 is passed through an inverting circuit 19 to provide an indication at the appropriate logic level that the address has not been decoded.

In addition to the control signals identified and defined above, the following control signals are also utilized in the circuit illustrated in FIG. 1. A signal L is generated whenever data from the loop is to be loaded into the storage device associated with the interface. A signal U is generated when data is to be unloaded or transmitted down the loop in the down stream direction. Another signal R is generated whenever data on the loop is to be received by the terminal device associated with the interface. A signal D is generated by the terminal devices associated with the loop. This signal indicates that the terminal device has finished sending a message and indicates either the end of a block of data or the end of a complete message. A signal T is also provided by the terminals associated with the interface which indicates that the terminal has data to send and constitutes a request to transmit. Another signal G is generated to indicate that the interface must generate frame or synchronizing entities or characters, and a signal X is generated to cause or control the transmission of data from the terminal in a down stream direction onto the loop. Signals D and T are provided directly by the connected terminal device, and are conventional signals normally provided by terminals. The generation of signals B, L, U, R, G, and X will be described in detail later, in connection with the description of FIGS. 2–8.

An output is taken from the last stage of shift register 15 and applied to one input of an AND gate 20, which is under control of the load signal L. The output of AND gate 20 is applied to the input of the first stage of a shift register 21. Shift register 21 is provided with N sections, each providing storage for a complete entity or character. The sections SR1 through SRn are interconnected as shown in the drawing. Each stage is provided with an input and an output. The output of each of the stages SR1 through SRn-1 is connected to the input of the subsequent stage. Each section is provided with a separate shift control input. The connections of the inputs and outputs to the remainder of the circuits will be described below. During a loading sequence, data will be inserted bit by bit into the first position of section SR1, and will precede in serial fashion down through the various stages. The number of stages provided will depend on the maximum message length which a terminal connected to the interface would be expected to transmit.

The S1 output from clock generator 14 is applied to one input of AND circuit 22, which is under control of the load signal L. AND circuit 22 transmits the S1 clocking pulses under control of the load signal. These are applied from the output of AND circuit 22 via a plurality of OR circuits 23-1 through 23-n to the shift inputs of sections SR1 through SRn respectively. With the arrangement described above, during the loading mode, shift pulses are applied to all sections of the shift register 21, and data appearing at the output of AND circuit 20 is serially shifted by bit from the input position of the first section SR1 through the shift register towards the output section S of stage SRn. The S1 output of clock generator 14 is also applied to one input of an AND gate 24, which is under control of the unload signal U described above. The output of AND circuit 24 is connected to one input of a plurality of AND circuits 25-1 through 25-n. These AND circuits are enabled by outputs 1 through n from a counter, which will be described in connection with the description of FIG. 2. Thus, the output S1 from clock generator 24, during unload mode, will be applied via AND gates 25-1 to 25-n, and OR circuits 23-1 to 23-n, under control of the counter to the appropriate sections of the shift register SR1 through SRn for shifting the contents in one section only.

The outputs of stages SR1 through SRn of shift register 21 are connected to one input of AND circuits 26-1 through 26-n respectively. AND circuits 26-1 through 26-n are under control of the outputs 1 through n of the counter, which will be described in connection with the description of FIG. 2. The outputs of AND circuits 26-1 through 26-n are connected to one input of an AND circuit 27, which is under control of the unload signal U. The output of AND circuit 27 is connected to terminal 11, and causes signals passed thereby under control of U to go down stream on the loop.

A frame or sync signal generator 28 is connected by an AND gate 29, under control of the generate frame signal G, to terminal 11 on the loop, and provides frame or sync characters whenever the terminal associated with the interface is receiving and not simultaneously therewith, sending data. Data for the terminal 30, associated with the interface, is sent from the output stage of serial shift register 15 via an AND gate 31 to the input of the terminal 30. AND gate 31 is under control of the receive data signal R, the generation of which will be described below. When the terminal 30 transmits data, the output of terminal 30 is connected to terminal 11, associated with the loop via an AND gate 32 under control of the transmit signal X. Generation of transmit signal X will be described below. Terminal 30, as previously described, provides a signal D which indicates the end of block or message, and a signal T which is a request to transmit or a service needed signal. In addition, a signal $\bar{T}$ is provided for indicating that the terminal does not need service or does not have data to transmit.

Figure 2:
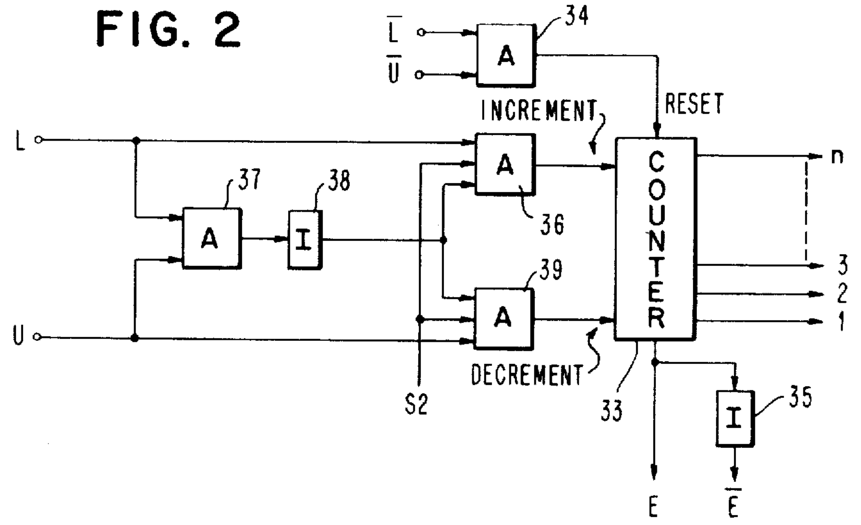
FIGS. 2–8, inclusive, are block diagrams illustrating the generation of signals utilized in FIG. 1, and as such, constitute part of the system illustrated therein.

In FIG. 2, a reversible counter 33 is provided with outputs 1 through *n*. These outputs are the same outputs applied to AND circuits 25-1 through 25-n and 26-1 through 26-n in FIG. 1. Counter 33 increments or decrements once with each clocking pulse S2. The counter will increment under control of the load signal L, and decrement under control of the unload signal U, each time a clocking pulse S2 occurs while these signals are active. The counter will neither increment or decrement if the load signal L and the unload signal U are simultaneously present. In this instance, the counter remains at whatever count it has achieved. The reset state of counter 33 is labeled E, and this is the state to which the counter normally returns under conditions which will be described, or is reset too under unusual ending circumstances. If both the load signal L and the unload signal U are not present, the reset input to the counter is activated via an AND circuit 34 causing the counter to reset to the state E. An inverter 35 provides an E signal, which will be utilized in subsequently described circuits. The S2 clock pulses from clock generator 14 are applied to one input of an AND circuit 36, and are passed via AND circuit 36 to the increment input of counter 33 under control of the unload signal L. In addition, incrementing is inhibited when both the unload signal U and the load signal L are simultaneously present by and circuit 37 and inverter 38. The S2 signals from clock generator 14 are also applied to an AND circuit 39 and are applied via AND circuit 39 to the decrement input of counter 33. AND circuit 39 has an input under control of the unload signal U and the output of inverter 38. Thus, AND circuit 39 will not pass the S2 pulses to the decrement input of counter 33 unless the unload signal U is present and the load signal L is absent.

Figure 3:
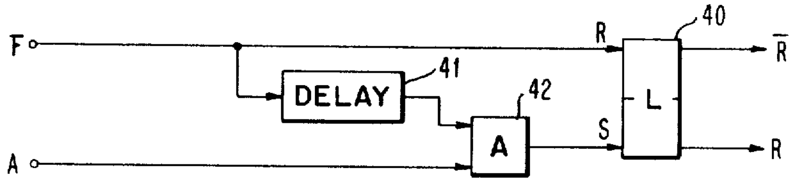

FIG. 3 illustrates how the receive signal R is generated. When a latch 40 is set, a signal $\bar{R}$ is generated. When the latch is reset, a signal R is generated. The reset input of latch 40 is connected to the frame or F signal provided by AND gate 17. In addition, the signal is delayed in a delay circuit 41 and applied to one input of an AND gate 42. The address signal A from AND gate 18 is applied to the other input of AND gate 42, and when a frame signal is immediately followed by the address signal, the AND gate 42 provides an output which sets latch 40 to indicate that the interface is to go into the receive mode and receive data at the associated or connected terminal.

Figure 4:
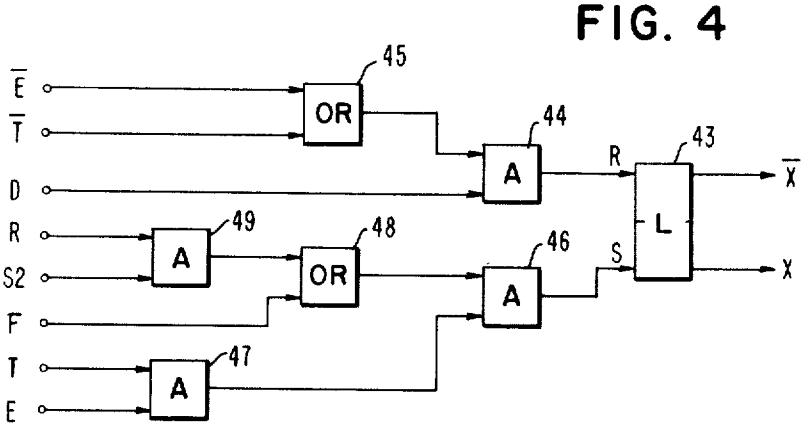

FIG. 4 illustrates how the transmit signal X and the not transmit signal $\bar{X}$ are generated. A latch 43, when set, provides the X signal, and when reset, provides the $\bar{X}$ signal. Latch 43 is reset only when the terminal has completed transmission of a message by generating the D signal. The D signal is applied to one input of an AND circuit 44, which has its other input connected to the output of an OR circuit 45, which is connected to the output of the inverter 35, which provides the $\bar{E}$ signal and to the $\bar{T}$ signal provided by the terminal. Latch 43 is set under control of the output of an AND circuit 46. One input to the AND circuit 46 is derived from the output of another AND circuit 47, which responds to the simultaneous occurrence of T from the terminal and E from the counter 33. The other input of AND circuit 46 is derived from the output of an OR circuit 48 which has one input connected to the frame signal from the AND gate 17. The other input to the OR circuit 48 is derived from the output from an AND circuit 49, which is connected to the reset R output of latch 40, and to the output S2 from clock generator 14. With this arrangement, latch 43 will be set if a frame signal F is received and the terminal requires service while the counter 33 is set at E or zero. This indicates service is needed by the terminal, and may be provided because of the receipt of the frame signal from the loop at terminal 10. In addition, while the terminal is receiving data, it may transmit data. Thus, if the output of AND circuit 47 is up, indicating that the terminal requires service, and it is at a 0 or E count, that is, data is not being stored for another terminal which would be the case when the terminal is receiving data, then transmission may be started upon the occurrence of S2. Obviously, the R signal is available if the terminal is receiving, and its application to AND gate 49 along with the occurrence of S2 will cause the latch 43 to be set provided the other conditions specified by AND gate 47 are met.

Figure 5:
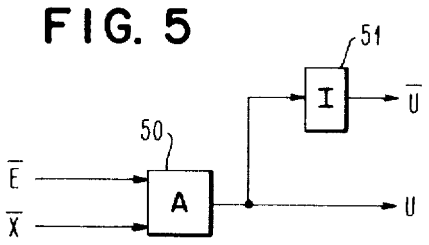

In FIG. 5, an AND circuit 50 provides an output indicating the unload condition $\bar{U}$ whenever $\bar{E}$ and $\bar{X}$ are present. An inverter 51 provides the U output utilized elsewhere. The unload function, enabled by the U signal from AND gate 50, must be instituted when transmission by the terminal stops provided the counter 33 does not reside at the reset condition E, since this indicates that data has been stored in the counter and at the termination of transmission by the terminal, the data previously stored in the shift register 21 must be unloaded onto the loop at terminal 11.

Figure 6:
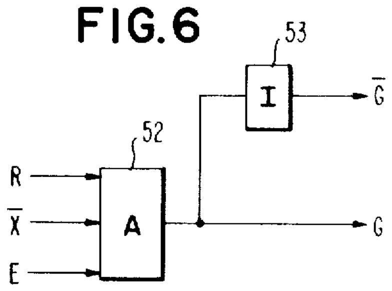

An AND gate 52 in FIG. 6 provides the generate signal G whenever the three input conditions illustrated are satisfied, that is, whenever the R signal is available from latch 40, the $\bar{X}$ signal from latch 43 and the E signal from the counter 33. The G signal is utilized to cause frames from the frame or sync generator 28 to be inserted onto the loop at terminal 11 while data is being received, and the terminal does not have a need to transmit data. These frame signals inserted from the frame or sync generator 28 permit interfaces further down on the loop to generate and transmit data if they have data to send. An inverter 53 connected to the output of AND gate 52 provides the G signal utilized elsewhere.

Figure 7:
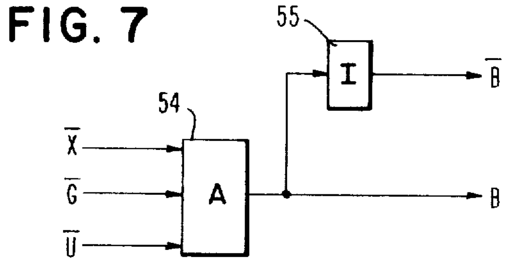

An AND circuit 54 in FIG. 7, provides the bypass signal B when the three input conditions illustrated are satisfied, that is, $\bar{X}$, $\bar{G}$, and $\bar{U}$. These three signals indicate that the terminal interface and the terminal associated therewith are inactive, that is, the terminal is not receiving data nor does it have a need to transmit data, and the data on the loop is bypassed directly from terminal 10 to terminal 11 via AND circuit 13. An inverter 55 connected to the output of AND circuit 54, provides the $\bar{B}$ signal utilized elsewhere.

Figure 8:
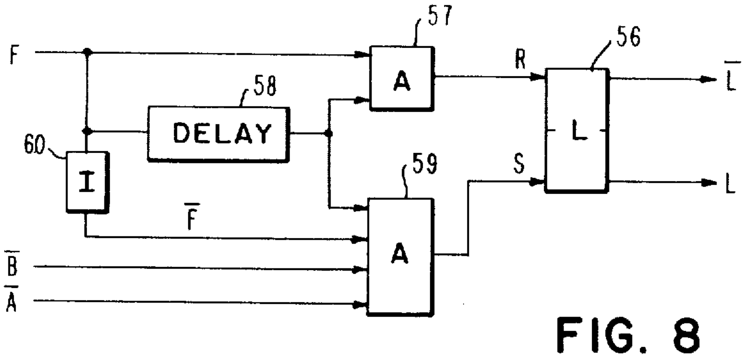

A latch 56 in FIG. 8, provides the load signal L when set, and the not load signal $\bar{L}$ when reset. Latch 56 is set by the output of an AND circuit 57, which is provided when two sequential frame or synchronizing signals are received. The frame signal from AND gate 17 is applied directly to one input of AND gate 57, and to the other input of AND gate 57 via a delay circuit 58, which provides a single entity or character delay time. Latch 56 is set under control of an AND gate 59. AND gate 59 is provided with four inputs. One of these four inputs is connected to the output of delay circuit 58. The second is connected to $\bar{B}$, and third to $\bar{A}$, and the fourth is connected via an inverter 60 to the F input. Thus, latch 56 is set if a frame character or entity is immediately followed by a non-frame character when the interface is not in bypass mode, and the non-frame character is not the terminal address.

Figure 9:
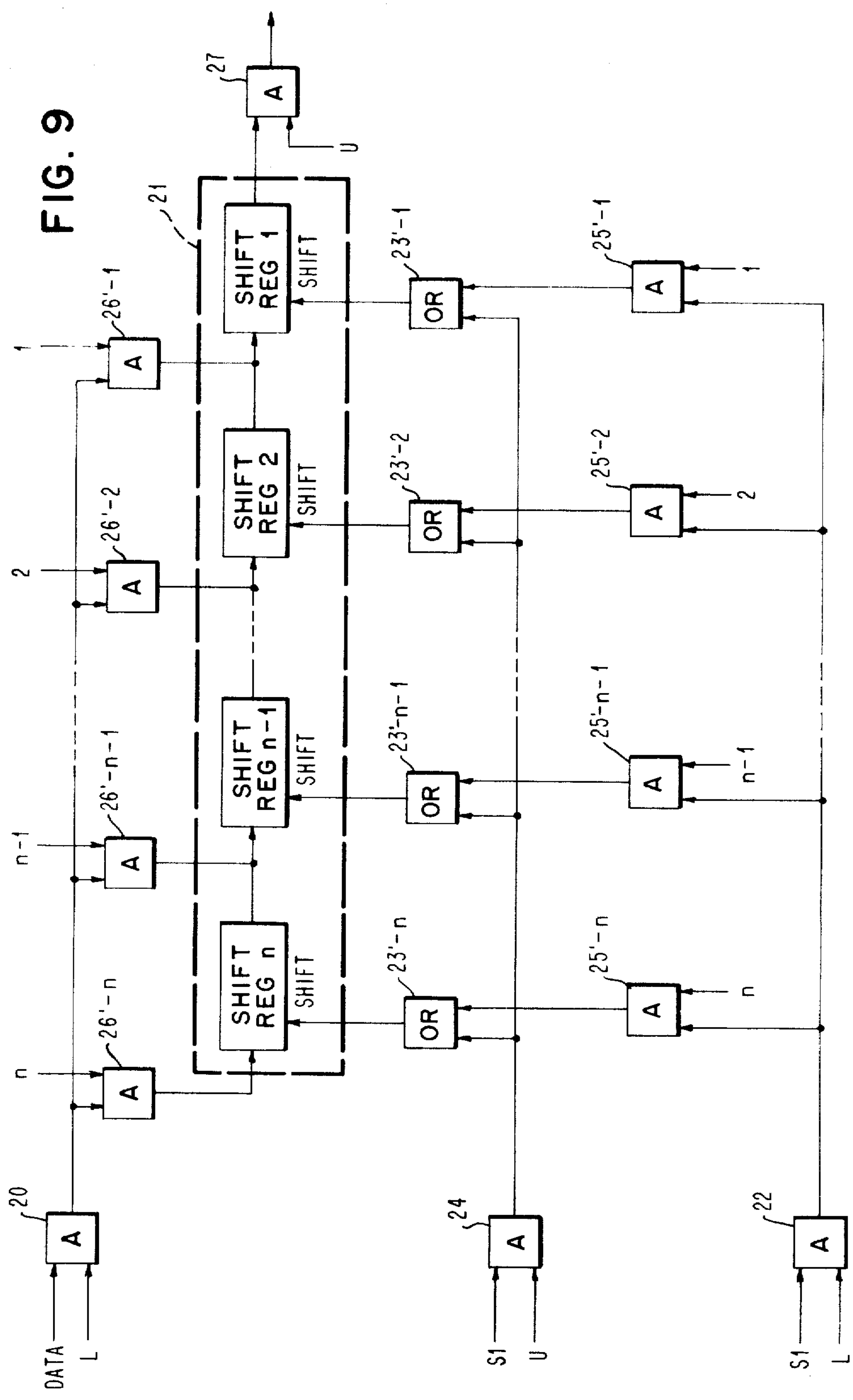
FIG. 9 is a block diagram illustrating the changes necessary in the diagram of FIG. 1, to construct an alternative interface.

FIG. 9 illustrates an alternative mirror image mode of operating the loading and unloading of serial shift register 21. In this mode, as contrasted to the one described in connection with FIG. 1, data is always removed from the first shift register position SR1, which is now located at the right hand side of the register via the single AND circuit 27, previously described. The data is loaded sequentially under control of the counter 33 is shift register positions SR1 through SRn under control of the outputs from counter 33 operating on gates 26'-1 through 26'-n. The clocking pulses are applied in substantially the same manner, however, the clocking pulses under control of the unload signal U are applied broadside to all of the shift register sections SR in contrast to FIG. 1, and the shift pulses S1 are applied under control of L selectively to the various shift register sections SR1 to SRn under control of the outputs 1 through *n* respectively from counter 33. According to this modification, data is always removed from the output of section SR1. The various sections are loaded in sequence under control of counter 33, and the shift pulses are applied either broadside during the unloading sequence, or selectively to the appropriate shift register sections during the loading sequence to cause the data to be loaded into the appropriate register sections.

OPERATION

When the terminal or terminals associated with the interface are neither receiving or transmitting data, the bypass signal B is available. This signal enables AND gate 13, causing data traffic on the loop to pass directly from terminal 10 through AND gate 13 to terminal 11, and thus in the down stream direction, to subsequent terminal interfaces on the loop. However, if there is no data on the loop indicated by the receipt of framing or synchronizing characters and the shift register 21 is vacant indicated by state E of counter 33, a terminal desiring to transmit will be permitted to transmit. At this time, the bypass signal B disappears, and the bypass link between terminals 10 and 11 is interrupted. At the same time, the terminal 30 is permitted to transmit via AND gate 32 directly to terminal 11 in the down stream direction. If, during the course of transmitting as defined above, data for a subsequent terminal on the loop is received at terminal 10, the data will be stored in shift register 21 until the terminal 30 completes transmission of the message in process. At the time data for a subsequent terminal is received, the load signal L is generated by the circuit described in FIG. 8. This occurs upon the detection of a frame or synchronizing character immediately followed by a non-frame or synchronizing character. When the load signal L is available, AND gate 22 is enabled, causing the S1 clock from clock generator 14 to be applied via the OR circuits 23-1 through 23-n to the shift inputs of shift register 21, sections SR1 through SRn, causing data appearing at the output of AND circuit 20 to be shifted serially through the shift register section of shift register 21. The shift register will not fill entirely before terminal 30 completes transmission, since it includes more or at least as much storage as a maximum length message which terminal 30 is permitted to transmit. Loading will continue as long as data is present at terminal 10. In the event that the data message being received terminates before terminal 30 completes transmission, the shifting process will be interrupted since latch 56, FIG. 8, will become reset upon the receipt of two consecutive frame or synchronizing characters, and the data previously received will be stored in the shift register as static data.

When terminal 30 completes transmission, the unload signal U is generated by the circuits illustrated in FIG. 5. At this time, assuming that data is still being received, the data in shift register 21 will be removed from the output of the stage indicated by the then attained value of counter 33. This data will be passed through the associated AND gate, and AND gate 27 to terminal 11. In the meantime, data which is being received at terminal 10 will be inserted into the input of shift register section SR1. As soon as data is no longer received at terminal 10, the loading signal will cease, and the counter 33 will begin to decrement, thus causing the shift register to operate in a different mode. At this time, shifting is restricted to each of the sections, and progresses from the section which was previously connected to the input of AND gate 27 after each of the characters have been shifted out of that section to the next section to the left, until the shift register has been cleared. If data should suddenly reappear, it reverts to the mode previously described, where both L and U occur simultaneously.

The shift register arrangement disclosed in FIG. 9 is, as previously stated, a mirror image operation of the shift register arrangement shown in FIG. 1. It operates substantially the same as the shift register arrangement shown in FIG. 1, however, data is entered from right to left and removed from the rightmost position SR1 of the shift register 21. The net effect is identical, however, and the operation is substantially the same. In this instance, during the loadingg operation, the first received message character is inserted under control of the counter 33 in the first section SR1, while shifting pulses are applied via the AND circuit 25'-1 under control of the counter 33. In succession, the characters received are inserted in the successive stages or sections of the shift register 21. When transmission of the message by the terminal terminates, the input of the data from the line is frozen, while the output is instituted under the unload signal U via gate 27. Thus, the data will come in through a fixed stage and progress from there to the output stage SR1, and then out through AND gate 27 to terminal 11. When the loading sequence terminates, that is, at the detection of the last message character, the data is shifted serially from various register positions to subsequent register positions until eventually the last data character exists through the output of shift register section SR1 under control of the clocking signals supplied by AND circuit 24 of FIG. 9.

While the invention has been particularly shown and described with references to preferred embodiments thereof, it will understood by those skilled in the art that various changes in form and detail may be made therein without departing from the spirit and scope of the invention.

What is claimed is:

1. A store and forward interface for a serial loop data communications system comprising:

a first data path for bypassing multibit data entity signals on the loop around the interface;

first control means for selectively enabling and disabling said first data path;

a second data path for accepting data from said loop and reinserting the data accepted at a later time, said second path including:

storage means having a plurality of sequentially arranged multibit data entity storage locations, a local source of multibit data entity signals, means for selectively connecting the storage means and the local source to the communications loop, and second control means responsive to said local source of data entity signals and said data entity signals on the loop for providing: first signals indicative of the status of the storage means for controlling said storage means; second signals to said first control means for interrupting said bypass data signal path and for connecting said local data entity source to the loop for transmitting data entity signals when said storage device status signals indicate that the storage means has no data entity signals stored therein, the local source has data entity signals to transmit, and data entity signals for subsequent interfaces are not being received; third signals for controlling said storage means to cause data signal entities received while the local source is transmitting data entity signals to be stored in successive entity storage locations under control of said first signals; and fourth signals when said first signals indicate that the storage contains data entity signals and said local source completes transmission for connecting said storage means to the loop to transmit the stored signal entities to the loop in the order received; said second control means inhibiting changes in the first signals indicating the storage status when the third and fourth signals occur simultaneously whereby received data entity signals are inserted as received in the same storage location and transmitted data entity signals are removed from the same storage location.

2. A store and forward interface for a serial loop data communications system as set forth in claim 1, in which said storage means having a plurality of sequentially arranged multibit data entity storage locations includes:

a serial shift register divided into a plurality of multibit sections each capable of storing a single multibit data entity;

first means responsive to said third signals for applying said received data entity signals to the first section of the serial shift register;

second means responsive to said third signals for applying shifting pulses to all of the shift register sections whereby the bits comprising the data signals are inserted into the shift register in the order received;

third means responsive to said fourth signals and said first signal for applying shifting pulses to the shift register sections indicated by the said first signal whereby the data entity stored in the indicated sections is shifted; and fourth means responsive to said first and fourth signals for connecting the indicated section to the means for selectively connecting the storage means to the communications loop.

3. A store and forward interface for a serial loop data communications system as set forth in claim 2, in which said second control means includes;

a bidirectional counter having incrementing and decrementing inputs and a plurality of unique outputs at least one greater in number than the number of stages in the serial shift register;

first means for applying signals to said counter incrementing input each time a data entity is received for storage in the register;

second means for applying signals to said counter decrementing input each time a data entity is to be transmitted from the storage; and third means for inhibiting changes in the counter when data entities are to be simultaneously received for storage and transmitted from storage.

4. A store and forward interface for a serial loop data communications system as set forth in claim 1, in which said storage means having a plurality of sequentially arranged multibit data entity storage locations includes:

a serial shift register divided into a plurality of multibit sections each capable of storing a single multibit data entity;

first means responsive to said third signals and said first signals for applying said received data entity signals to the shift register section indicated by the first signals;

second means responsive to the third signals and the first signals for applying shifting pulses to the section of the shift register indicated by the first signals whereby the bits comprising each data entity are inserted into the sections indicated by the first signals;

third means responsive to said fourth signals for applying shifting pulses to all of the shift register sections whereby the stored bits are shifted towards the final section; and fourth means responsive to said fourth signals for connecting the final section of the shift register to the means for selectively connecting the storage means to the communications loop whereby data entities are transmitted under control of said fourth signals in the order received.

5. A store and forward interface for a serial loop data communications system as set forth in claim 4, in which said second control means includes:

a bidirectional counter having incrementing and decrementing inputs and a plurality of unique outputs at least one greater in number than the number of stages in the serial shift register;

first means for applying signals to said counter incrementing input each time a data entity is received for storage in the register;

second means for applying signals to said counter decrementing input each time a data entity is to be transmitted from the storage; and third means for inhibiting changes in the counter when data entities are to be simultaneously received from storage and transmitted from storage.

* * * * *